United States Patent
Wariishi et al.

(10) Patent No.: US 7,201,990 B2
(45) Date of Patent: Apr. 10, 2007

(54) FUEL CELL STACK

(75) Inventors: Yoshinori Wariishi, Utsunomiya (JP);
Masaharu Suzuki, Utsunomiya (JP);
Hideaki Kikuchi, Kawachi-gun (JP);
Narutoshi Sugita, Utsunomiya (JP);
Ichiro Baba, Utsunomiya (JP); Ken Takahashi, Utsunomiya (JP); Seiji Sugiura, Utsunomiya (JP); Yosuke Fujii, Kawachi-gun (JP); Daisuke Wachi, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 275 days.

(21) Appl. No.: 10/245,676

(22) Filed: Sep. 17, 2002

(65) Prior Publication Data

US 2003/0054224 A1 Mar. 20, 2003

(30) Foreign Application Priority Data

Sep. 17, 2001 (JP) ............................. 2001-282129
Oct. 4, 2001 (JP) ............................. 2001-309168

(51) Int. Cl.
*H01M 8/04* (2006.01)

(52) U.S. Cl. .......................................... 429/39; 429/34

(58) Field of Classification Search .................. 429/17, 429/34, 39
See application file for complete search history.

(56) References Cited

U.S. PATENT DOCUMENTS

| 5,306,575 | A | * | 4/1994 | Camara et al. ................ 429/16 |
| RE36,148 | E | | 3/1999 | Strasser ........................ 429/13 |
| 6,033,794 | A | * | 3/2000 | George et al. ................. 429/24 |
| 6,083,636 | A | * | 7/2000 | Hsu ............................. 429/13 |
| 6,344,289 | B2 | * | 2/2002 | Dekker et al. ................. 429/17 |

FOREIGN PATENT DOCUMENTS

| DE | 19647417 | 12/2002 |
| JP | 10-284095 A | 10/1998 |

* cited by examiner

*Primary Examiner*—Mark Ruthkosky
(74) *Attorney, Agent, or Firm*—Lahive & Cockfield, LLP; Anthony A. Laurentano, Esq.

(57) ABSTRACT

An intermediate plate is interposed between first and second sub-stacks. The intermediate plate has, defined in a surface thereof, an oxygen-containing gas mixing passage interconnecting an oxygen-containing gas outlet in the first sub-stack which is located upstream and an oxygen-containing gas inlet in the second sub-stack which is located downstream. In the first and second sub-stacks, an oxygen-containing gas is supplied from the oxygen-containing gas inlet and discharged to the oxygen-containing gas outlet at all times.

9 Claims, 13 Drawing Sheets

FUEL CELL STACK

BACKGROUND OF THE INVENTION

1. Field of the Invention

The present invention relates to a fuel cell stack comprising a stack of sub-stacks, with intermediate plates interposed therebetween, each comprising a stack of membrane electrode assemblies, with separators interposed therebetween, each having an anode, a cathode, and an electrolyte sandwiched between the anode and the cathode.

2. Description of the Related Art

Solid polymer electrolyte fuel cells, for example, employ an ion exchange membrane (electrolyte) comprising a polymer ion exchange membrane (proton ion exchange membrane). A membrane electrode assembly comprises an anode and a cathode, each made up of an electrode catalyst and a porous carbon panel, that are disposed on the opposite sides of the ion exchange membrane. The membrane electrode assembly is sandwiched between separators (bipolar plates), making up a unit cell for generating electricity. A predetermined number of such unit cells are stacked for use as a fuel cell stack.

When a fuel gas, e.g., a gas mainly containing hydrogen (hereinafter referred to as "hydrogen-containing gas") is supplied to the anode, the hydrogen in the gas is ionized on the electrode catalyst and moves through the ion exchange membrane to the cathode. Electrons are supplied to an external circuit, which uses the electrons as an electric energy of a direct current. Since the cathode is supplied with a gas mainly containing oxygen (hereinafter referred to as "oxygen-containing gas"), for example, hydrogen ions, electrons, and oxygen react with each other on the cathode, producing water.

If the fuel cell stack is to be used on motor vehicles, then it is required to produce a relatively large output. To meet such a requirement, it is customary to use a stack of many unit cells. As the number of stacked unit cells increases, however, a temperature distribution tends to occur along the stack, and the ability of the fuel cell stack to discharge generated water produced by an electrochemical reaction in the fuel cells is lowered, failing to provide a desired electric energy generating capability.

One known solution to the above problem is an apparatus disclosed in U.S. Pat. No. RE36,148. In the disclosed apparatus, as shown in FIG. 12 of the accompanying drawings, a fuel cell block 1 is divided into a first cell group 2, a second cell group 3, and a third cell group 4, which are stacked in the direction in which a reactant gas, e.g., a fuel cell, is supplied, i.e., the direction indicated by the arrow a. The first through third cell groups 2, 3, 4 have respective numbers of unit cells 5a, 5b, 5c.

The fuel cell block 1 is supplied with the reactant gas through a line 6. The reactant gas is first supplied concurrently to the unit cells 5a of the first cell group 2. After having been discharged from the first cell group 2, the reactant gas is supplied concurrently to the unit cells 5b of the second cell group 3. Thereafter, the reactant gas is discharged from the second cell group 3 and supplied concurrently to the unit cells 5c of the third cell group 4. With the disclosed arrangement, it is possible to effectively discharge produced water and an inactive gas from the fuel cell block 1 and to increase the electric energy generating capability of the fuel cell block 1.

In the fuel cell block 1, the reactant gas flows in alternately opposite directions in the first through third cell groups 2, 3, 4, and the first through third cell groups 2, 3, 4 need to have different separator structures. Therefore, the fuel cell block 1 requires an increased number of different types of separators, and is not economical due to the relatively high cost of manufacturing required separators.

When the ion exchange membranes of a fuel cell stack are dried, the fuel cell stack is unable to operate at a high output density. Therefore, it is necessary to humidify the ion exchange membranes while the fuel cell stack is in operation. There have been proposed various processes for humidifying the fuel cell stack. The proposed humidifying processes include an external humidifying process, an internal humidifying process, and a self-humidifying process. According to the external humidifying process, a humidifier such as a bubbler or the like is provided outside of the fuel cell stack, and a reactant gas is humidified by the humidifier to supply moisture to a membrane electrode assembly for thereby humidifying ion exchange membranes in the membrane electrode assembly. According to the internal humidifying process, each unit cell has a humidifier (humidifying structure) incorporated therein for humidifying ion exchange membranes in the membrane electrode assembly. According to the self-humidifying process, which is a type of the internal humidifying process, ion exchange membranes in the membrane electrode assembly are humidified by water generated as a result of an electrochemical reaction in the ion exchange membranes.

The external humidifying process makes the entire fuel cell assembly large in size and causes the fuel cell assembly to take up a large space because the humidifier is required as an additional device outside of the fuel cell stack. The external humidifying process is also disadvantageous in that the humidifier may suffer a follow-up capability problem when the load on the fuel cell stack is abruptly increased.

The internal humidifying process includes a humidifying process which employs water absorption fibers embedded in ion exchange membranes, a humidifying process which employs water permeable plates extending from anodes, and a humidifying process which employs water absorption fibers held in contact with anode sides of ion exchange membranes. These humidifying processes, however, are problematic in that the ion exchange membranes cannot easily be repaired in case they are not sufficiently humidified for some reasons.

The self-humidifying process includes a humidifying process which employs fine particles of platinum dispersed in ion exchange membranes for generating water due to a reaction between hydrogen and oxygen gases which flow in from anodes and cathodes, and a humidifying process which employs very thin ion exchange membranes for passing water produced in cathodes therethrough to anodes. These humidifying processes are highly costly to carry out because they need special ion exchange membranes, and are problematic in that it is difficult to produce ion exchange membranes having desired characteristics.

It has been proposed to use the technical concept of a solid polymer electrolyte fuel cell disclosed in Japanese laid-open patent publication No. 10-284095 in a structure for humidifying ion exchange membranes.

According to the proposed scheme, as shown in FIG. 13 of the accompanying drawings, a separator 7 of a solid polymer electrolyte fuel cell has a reactant gas inlet 8a and a reactant gas outlet 8b which are defined through the separator 7. The separator 7 also has a plurality of gas flow grooves 9 defined in a surface thereof in communication with the reactant gas inlet 8a and the reactant gas outlet 8b.

The separator 7 further includes an auxiliary inlet 8c defined therethrough in communication with intermediate portions of the gas flow grooves 9. A reactant gas introduced from the reactant gas inlet 8a into the gas flow grooves 9 is consumed as it flows through the gas flow grooves 9, combined with a dry reactant gas supplied from the auxiliary inlet 8c, and finally discharged from the reactant gas outlet 8b.

Since the reactant gas supplied from the auxiliary inlet 8c is dry, it lowers the partial pressure of water vapor contained in the reactant gas flowing through the gas flow grooves 9, thus preventing moisture from being condensed and hence preventing condensed water from being deposited and retained on wall surfaces of the gas flow grooves 9. The disclosed arrangement serves to provide a stable fuel cell capability.

The disclosed fuel cell structure may be used in a different condition as follows: The reactant gas inlet 8a is supplied with a reactant gas and moisture in an amount required to cause a reaction in an upstream region of the gas flow grooves 9, and the auxiliary inlet 8c is supplied with a low-humidify reactant gas in an amount required to cause a reaction in a downstream region of the gas flow grooves 9. Water generated when the reactant gas flows in the upstream region of the gas flow grooves 9 is used to humidify the low-humidify reactant gas supplied from the auxiliary inlet 8c, making it possible to supply the downstream region of the gas flow grooves 9 with a required amount of reactant gas and moisture. As a result, the amount of humidifying water may be reduced, and the entire fuel cell structure may be simplified and reduced in size.

When the separator 7 is in use, since the auxiliary inlet 8c supplies a dry reactant gas (low-humidify reactant gas) directly to the gas flow grooves 9, the humidified reactant gas flowing through the gas flow grooves 9 and the dry reactant gas may not be uniformly mixed with each other. Consequently, the humidify and concentration of the reactant gas supplied from the gas flow grooves 9 to electric energy generating regions tend to vary, resulting in a reduction in the electric energy generating capability.

SUMMARY OF THE INVENTION

It is a general object of the present invention to provide a fuel cell stack which is economical as a plurality of sub-stacks thereof use one type of separator, and which is capable of reliably maintaining a desired electric energy generating capability.

A major object of the present invention is to provide a fuel cell stack which is capable of uniformly mixing an unused additional reactant gas and a used reactant gas with each other, and of reliably maintaining a desired electric energy generating capability with a simple structure.

According to the present invention, an intermediate plate interposed between sub-stacks has a passage defined in a surface thereof, interconnecting a reactant gas outlet communication passage of an upstream sub-stack of the sub-stacks with respect to a direction in which a reactant gas is supplied, and a reactant gas inlet communication passage of a downstream sub-stack of the sub-stacks with respect to the direction. Therefore, the reactant gas discharged to the reactant gas outlet communication passage of the upstream sub-stack flows through the passage of the intermediate plate and is supplied to the reactant gas inlet communication passage of the downstream sub-stack.

In each of the sub-stacks, the reactant gas supplied from the reactant gas inlet communication passage and then discharged from the reactant gas outlet communication passage at all times. Since all the sub-stacks can use one type of separators, the fuel cell stack is highly economical as it is not necessary to prepare different types of separators for use in the sub-stacks.

According to the present invention, an intermediate plate interposed between sub-stacks has a passage defined in a surface thereof, interconnecting a reactant gas outlet communication passage of an upstream sub-stack of the sub-stacks, or a first sub-stack, with respect to a direction in which a reactant gas is supplied, an additional reactant gas supply port disposed near the reactant gas outlet communication passage, and a reactant gas inlet communication passage of a downstream sub-stack, or a second sub-stack, of the sub-stacks with respect to the direction. The passage has a guide for mixing an unused additional reactant gas supplied from the additional reactant gas supply port with a used reactant gas supplied from the reactant gas outlet communication passage, and delivering the mixed reactant gases to the reactant gas inlet communication passage.

Because the unused additional reactant gas and the used reactant gas which are supplied to the passage are uniformly mixed with each other by a guiding action of the guide, it is possible to reliably supply a reactant gas whose humidity and concentration are uniform to the reactant gas inlet communication passage of the second sub-stack. Thus, the electric energy generating capability of the second sub-stack is effectively increased with a simple arrangement, and the overall amount of humidifying water used in the fuel cell stack is reduced with ease.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
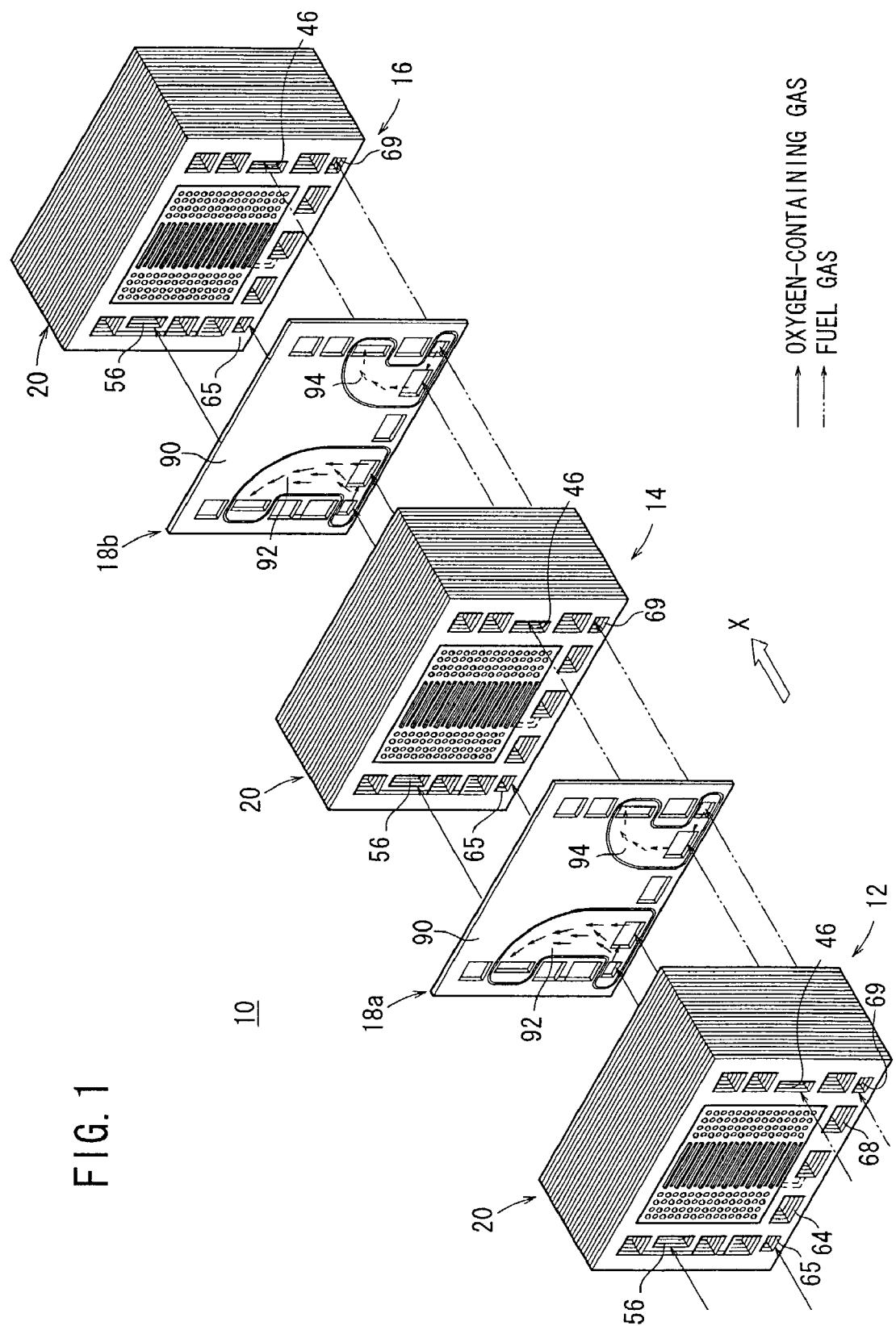
FIG. 1 is an exploded perspective view of a portion of a fuel cell stack according to a first embodiment of the present invention.

FIG. 1 shows in exploded perspective a portion of a fuel cell stack 10 according to a fir st embodiment of the present invention.

As shown in FIG. 1, the fuel cell stack 10 has a first sub-stack 12, a second sub-stack 14, and a third sub-stack 16 which are arrayed in the direction (indicated by the arrow X) in which an oxygen-containing gas and a fuel gas as reactant gases flow, with intermediate plates 18a, 18b interposed between the first through third sub-stacks 12, 14, 16.

Figure 2:
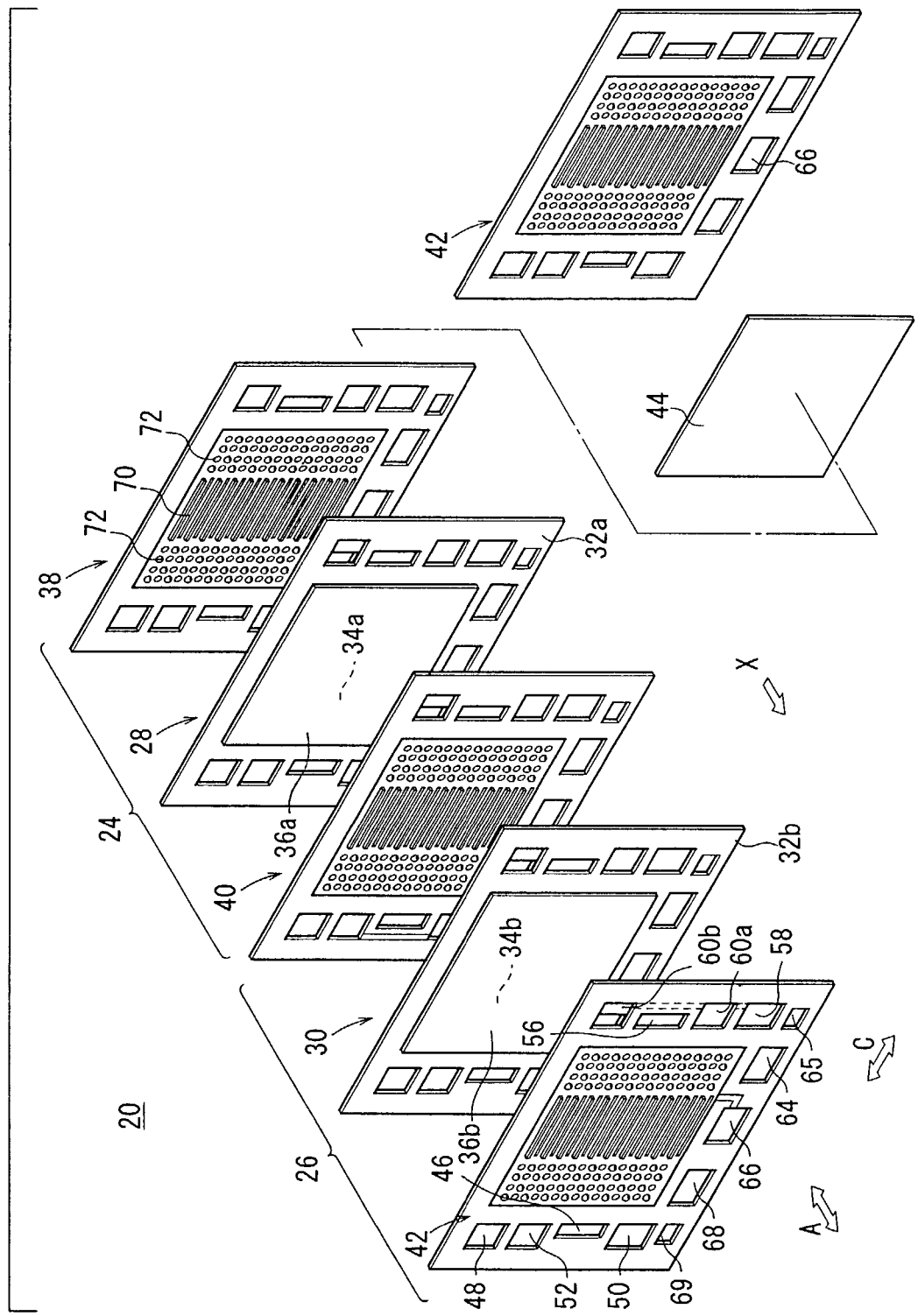
FIG. 2 is an exploded perspective view of a cell assembly of the fuel cell stack shown in FIG. 1.

The first through third sub-stacks 12, 14, 16 are identical in structure to each other, and each comprise a number of cell assemblies 20 stacked or superposed in the direction X. As shown in FIG. 2, each of the cell assemblies 20 comprises a first unit cell 24 and a second unit cell 26 which are superposed one on the other. The first and second unit cells 24, 26 have first and second membrane electrode assemblies 28, 30, respectively.

The first and second membrane electrode assemblies 28, 30 have respective solid polymer ion exchange membranes 32a, 32b, and respective cathodes 34a, 34b and respective anodes 36a, 36b which are disposed in sandwiching relation to the solid polymer ion exchange membranes 32a, 32b. Each of the cathodes 34a, 34b and the anodes 36a, 36b is made up of an electrode catalyst and porous carbon.

Figure 3:
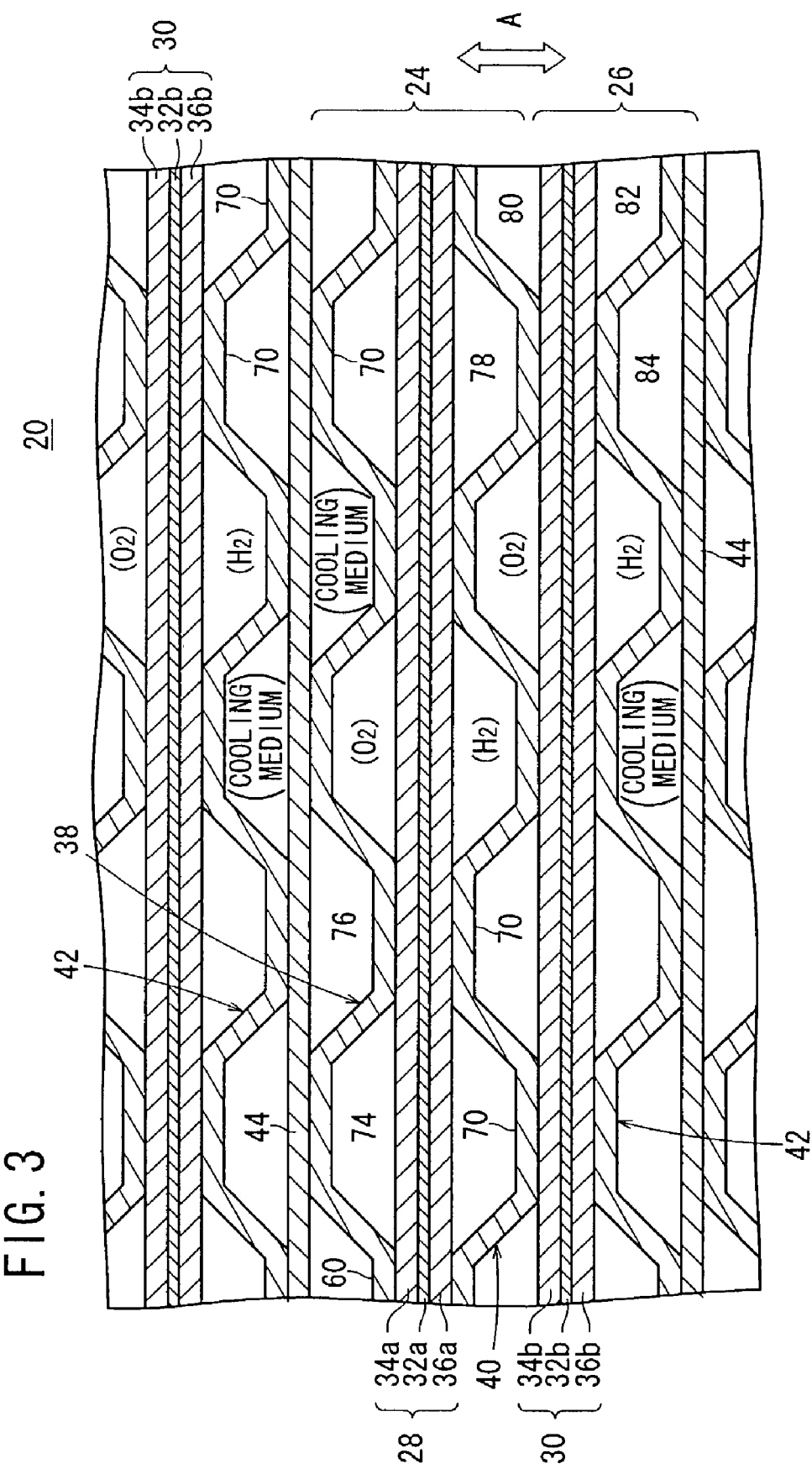
FIG. 3 is a fragmentary cross-sectional view of the cell assembly shown in FIG. 2.

As shown in FIGS. 2 and 3, a first separator 38 is disposed on one side of the first membrane electrode assembly 28 where the cathode 34a is provided. A second separator 40 is disposed between the other side of the first membrane electrode assembly 28 where the anode 36a is provided and one side of the second membrane electrode assembly 30 where the cathode 34b is provided. A third separator 42 is disposed between the other side of the second membrane electrode assembly 30 where the anode 36b is provided. Thin wall panels (partition walls) 44 are disposed the surfaces of the first and third separators 38, 42 which face each other.

Figure 4:
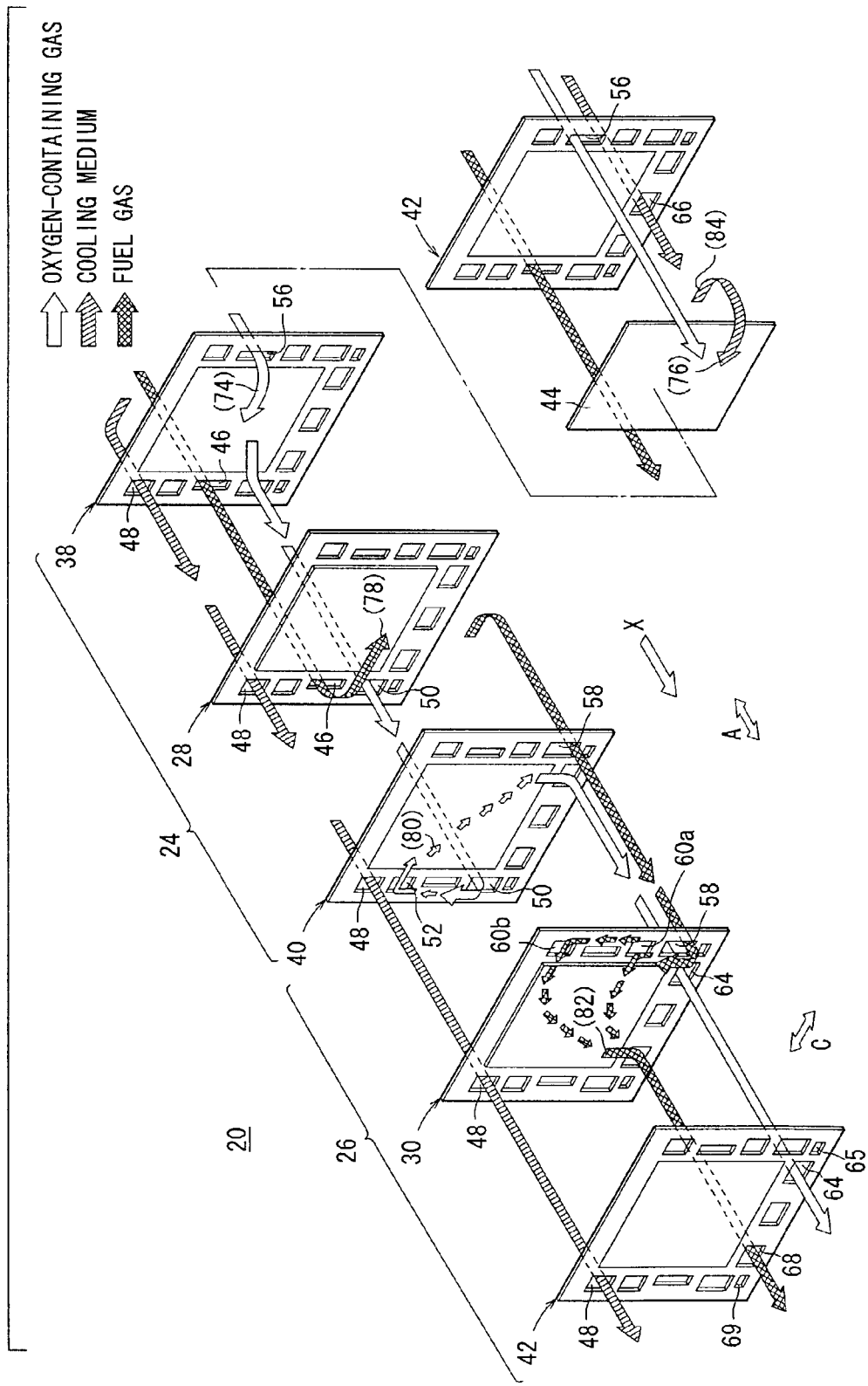
FIG. 4 is an exploded perspective view showing flows of an oxygen-containing gas, a fuel gas, and a cooling medium in the cell assembly shown in FIG. 2.

As shown in FIGS. 2 and 4, the first and second unit cells 24, 26 have, defined in one longitudinal end thereof in the direction indicated by the arrow C, respective fuel gas inlets (reactant gas inlet communication passages) 46 communicating with each other in the direction indicated by the arrow A in which the first and second unit cells 24, 26 are stacked, for passing a fuel gas (reactant gas) such as a hydrogen-containing gas therethrough, respective cooling medium outlets 48 communicating with each other in the direction indicated by the arrow A, for passing a cooling medium therethrough, respective intermediate oxygen-containing gas outlets 50 communicating with each other in the direction indicated by the arrow A, for discharging an oxygen-containing gas (reactant gas) such as air which has been supplied to the reaction in the first unit cell 24 that is located upstream with respect to the flow of the gas, and respective intermediate oxygen-containing gas inlets 52 communicating with each other in the direction indicated by the arrow A and also communicating with the intermediate oxygen-containing gas outlets 50, for introducing the oxygen-containing gas into the second unit cell 26 that is located downstream with respect to the flow of the gas.

The first and second unit cells 24, 26 have, defined in the other longitudinal end thereof, respective oxygen-containing gas inlets (reactant gas inlet communication passages) 56 communicating with each other in the direction indicated by the arrow A, respective intermediate fuel gas outlets 58 communicating with each other in the direction indicated by the arrow A, for discharging a fuel gas which has been supplied to the reaction in the first unit cell 24, and respective first and second intermediate fuel gas inlets 60a, 60b communicating with each other in the direction indicated by the arrow A and also communicating with the intermediate fuel gas outlets 58, for introducing the fuel gas into the second unit cell 16.

The first and second unit cells 24, 26 also have, defined in a lower edge thereof, respective oxygen-containing gas outlets (reactant gas outlet communication passages) 64 communicating with each other in the direction indicated by the arrow A, respective cooling medium inlets 66 communicating with each other in the direction indicated by the arrow A, and respective fuel gas outlets (reactant gas outlet communication passages) 68 communicating with each other in the direction indicated by the arrow A.

The first and second unit cells 24, 26 further have, defined therein near the oxygen-containing gas outlets 64, respective low-humidity oxygen-containing gas supply ports (additional reactant gas supply ports) 65 for supplying an oxygen-containing gas of a lower humidity than a humidified oxygen-containing gas supplied to the oxygen-containing gas inlets 56. The first and second unit cells 24, 26 further have, defined-therein near the fuel-gas outlets 68, respective low-humidity fuel gas supply ports (additional reactant gas supply ports) 69 for supplying a fuel gas of a lower humidity than a humidified fuel gas supplied to the fuel gas inlets 46. The low-humidity oxygen-containing gas supply ports 65 and the low-humidity fuel gas supply ports 69 make up communication holes defined in the first through third sub-stacks 12, 14, 16 and extending in the direction in which the cell assemblies 20 are stacked.

The first separator 38 comprises a thin metal plate, and has a plurality of straight grooves 70 defined centrally therein and extending a given length in the direction C (longitudinal direction), and a pair of embossed regions 72 disposed at respective opposite ends of the straight grooves 70 in the direction C and serving as buffer spaces. The straight grooves 70 and the embossed regions 72 are defined alternately in the opposite surfaces of the first separator 38. As shown in FIGS. 3 and 4, the straight grooves 70 and the embossed regions 72 which are defined in the surface of the first separator 38 which faces the cathode 34a of the first membrane electrode assembly 28 jointly provide an oxygen-containing gas passage 74 which has its opposite ends communicating respectively with the oxygen-containing gas inlet 56 and the intermediate oxygen-containing gas outlet 50 defined in the first separator 38.

The straight grooves 70 and the embossed regions 72 which are defined in the other surface of the first separator 38 which faces one of the surfaces of the wall panel 44 jointly provide a cooling medium passage 76 (see FIGS. 3 and 4) which has an end communicating with the cooling medium outlet 48 defined in the first separator 38 and the other end folded around an end of the wall panel 44 and communicating with the cooling medium inlet 66 in an adjacent third separator 42 on the other surface of the wall panel 44.

The second separator 40 is substantially identical in structure to the first separator 38. The second separator 40 has a fuel gas passage 78 comprising straight grooves 70 and embossed regions 72 which are defined in the surface of the second separator 40 which faces the anode 36a of the first membrane electrode assembly 28 (see FIG. 3). The fuel gas passage 78 communicates with the fuel gas inlet 46 and the intermediate fuel gas outlet 58 defined in the second separator 40 (see FIG. 4). The second separator 40 has an oxygen-containing gas passage 80 defined in the surface of the second separator 40 which faces the cathode 34b of the second membrane electrode assembly 30. The oxygen-containing gas passage 80 has an end communicating with the intermediate oxygen-containing gas outlet 50 through the intermediate oxygen-containing gas inlet 52 and the other end communicating with the oxygen-containing gas outlet 64.

The third separator 42 is substantially identical in structure to the first and second separators 38, 40. The third separator 42 has a fuel gas passage 82 defined in the surface of the third separator 42 which faces the anode 36b of the second membrane electrode assembly 30 (see FIGS. 3 and 4). The fuel gas passage 82 has an end communicating with the intermediate fuel gas outlet 58 through the first and second intermediate fuel gas inlets 60a, 60b, and the other end communicating with the fuel gas outlet 68. The third separator 42 has a cooling medium passage 84 defined in the surface thereof which faces the wall panel 44. As shown in FIG. 4, the cooling medium passage 84 has an end communicating with the cooling medium inlet 66 and the other end folded around an end of the wall panel 44 and held in communication with the cooling medium outlet 48.

Figure 5:
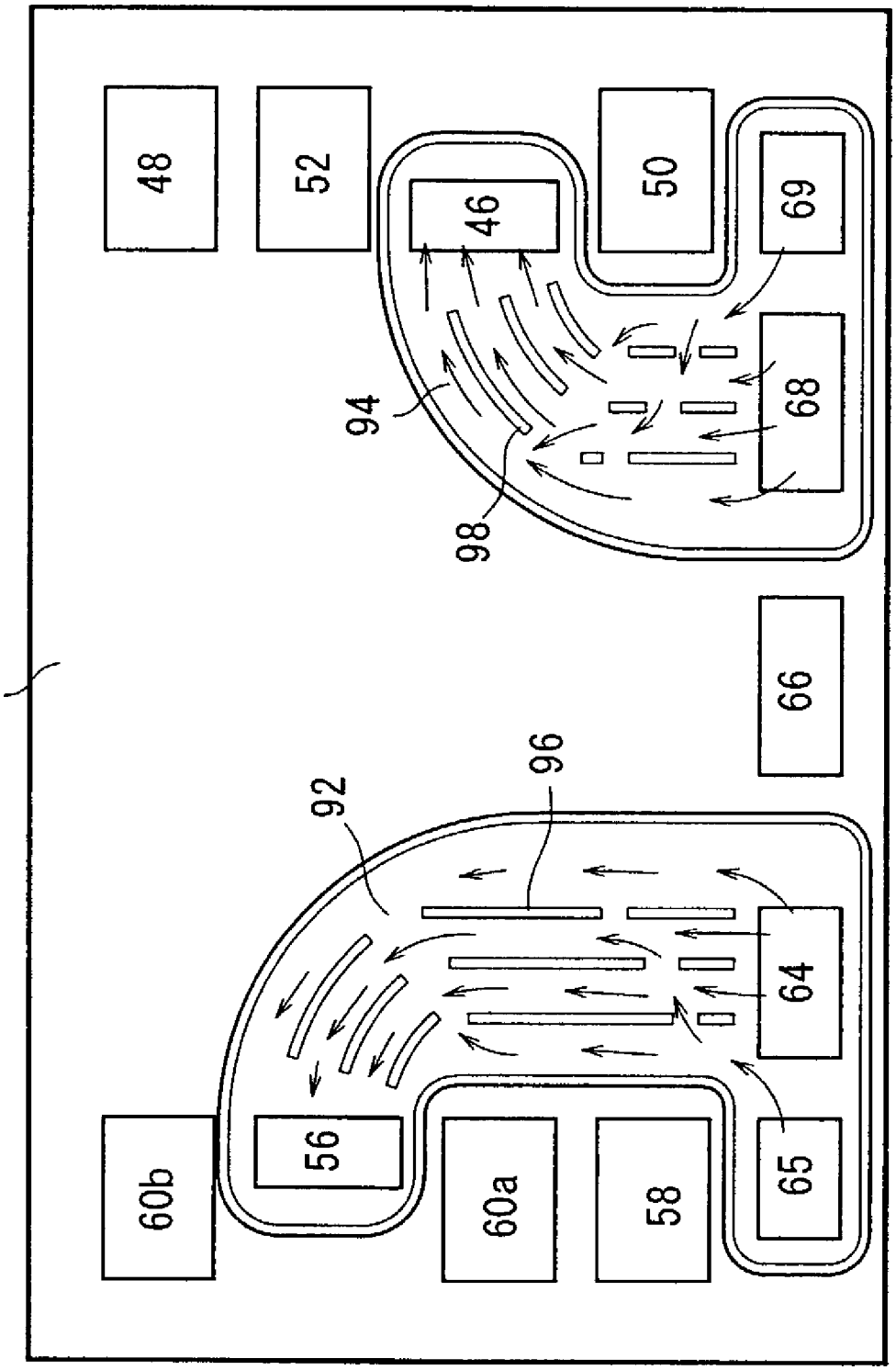
FIG. 5 is a front elevational view of an intermediate plate of the fuel cell stack shown in FIG. 1.

As shown in FIGS. 1 and 5, the intermediate plate 18a has, defined in one surface 90 thereof, an oxygen-containing gas mixing passage (oxygen-containing gas flow changing passage) 92 and a fuel gas mixing passage (fuel gas flow changing passage) 94. The oxygen-containing gas mixing passage 92 interconnects the oxygen-containing gas outlets 64 and the low-humidity oxygen-containing gas supply ports 65 of the first sub-stack 12 which is located upstream in the direction indicated by the arrow X and the oxygen-containing gas inlets 56 of the second sub-stack 14 which is located downstream in the direction indicated by the arrow X.

The oxygen-containing gas mixing passage 92 has a guide 96 for mixing an unused oxygen-containing gas supplied from the low-humidity oxygen-containing gas supply ports 65 with a used oxygen-containing gas supplied from the oxygen-containing gas outlets 64 and delivering the mixture to the oxygen-containing gas inlets 56.

The guide 96 comprises a plurality of ribs disposed in the oxygen-containing gas mixing passage 92. The positions, lengths, directions, and intervals of these ribs are selected to uniformize the mixture of the unused oxygen-containing gas and the used oxygen-containing gas.

The fuel gas mixing passage 94 interconnects the fuel gas outlets 68 and the low-humidity fuel gas supply ports 69 of the first sub-stack 12 and the fuel gas inlets 46 of the second sub-stack 14. The fuel gas mixing passage 94 has a guide 98 for mixing an unused fuel gas supplied from the low-humidity fuel gas supply ports 69 with a used fuel gas supplied from the fuel gas outlets 68 and delivering the mixture to the fuel gas inlets 46.

As with the guide 96, the guide 98 comprises a plurality of ribs disposed in the fuel gas mixing passage 94. The positions, lengths, directions, and intervals of these ribs are selected to uniformize the mixture of the unused fuel gas and the used fuel gas.

The first and second sub-stacks 12, 14 are identical in structure to each other. The oxygen-containing gas inlets 56 and the fuel gas inlets 46 of the second sub-stack 14 are located in the same positions as the oxygen-containing gas inlets 56 and the fuel gas inlets 46 of the first sub-stack 12 (see FIG. 1).

The intermediate plate 18b is identical in structure to the intermediate plate 18a. Those parts of the intermediate plate 18b which are identical to those of the intermediate plate 18a are denoted by identical reference characters, and will not be described in detail below.

The intermediate plate 18b has an oxygen-containing gas mixing passage 92 which interconnects the oxygen-containing gas outlets 64 and the low-humidity oxygen-containing gas supply ports 65 of the second sub-stack 14 which is located upstream in the direction X and the oxygen-containing gas inlets 56 of the third sub-stack 16 which is located downstream in the direction X, and a fuel gas mixing passage 94 which interconnects the fuel gas outlets 68 and the low-humidity fuel gas supply ports 69 of the second sub-stack 12 and the fuel gas inlets 46 of the third sub-stack 16.

The second and third sub-stacks 14, 16 are identical in structure to each other. The oxygen-containing gas inlets 56 and the fuel gas inlets 46 of the third sub-stack 16 are located in the same positions as the oxygen-containing gas inlets 56 and the fuel gas inlets 46 of the second sub-stack 14 (see FIG. 1).

The first through third sub-stacks 12, 14, 16 and the intermediate plates 18a, 18b which are constructed as described above are stacked in the direction X and fastened together by a fastening means (not shown), thereby making up the fuel cell stack 10.

Operation of the fuel cell stack 10 thus constructed will be described below.

In the fuel cell stack 10, the oxygen-containing gas inlets 56 of the cell assemblies 20 of the first sub-stack 12 are supplied with an oxygen-containing gas, and the fuel gas inlets 46 of the cell assemblies 20 of the first sub-stack 12 are supplied with a fuel gas (see FIG. 1). The cooling medium inlets 66 thereof are supplied with a cooling medium such as pure water, ethylene glycol, or the like. In the first sub-stack 12, the cell assemblies 20 stacked in the direction A are successively supplied with the fuel gas, the oxygen-containing gas, and the cooling medium.

As shown in FIGS. 3 and 4, the oxygen-containing gas is supplied to the oxygen-containing gas inlet 56 and introduced into the oxygen-containing gas passage 74 in the first separator 38 where it moves along the cathode 34a of the first membrane electrode assembly 28. The fuel gas is supplied to the fuel gas inlet 46 and introduced into the fuel gas passage 78 in the second separator 40 where it moves along the anode 36a of the first membrane electrode assembly 28. In the first membrane electrode assembly 28, therefore, the oxygen-containing gas supplied to the cathode 34a and the fuel gas supplied to the anode 36a are consumed by an electrochemical reaction in the electrode catalyst, generating electric energy.

The oxygen-containing gas, which has partly been consumed by the first membrane electrode assembly 28, is introduced from the oxygen-containing gas passage 74 into the intermediate oxygen-containing gas outlet 50, and moves in the direction A along the intermediate oxygen-containing gas outlet 50. As shown in FIG. 4, the oxygen-containing gas is introduced from the intermediate oxygen-containing gas inlet 52 into the oxygen-containing gas passage 80 in the second separator 40, and moves through the oxygen-containing gas passage 80 along the cathode 34b of the second membrane electrode assembly 30.

Similarly, the fuel gas, which has partly been consumed by the anode 36a of the first membrane electrode assembly 38, is introduced into the intermediate fuel gas outlet 58 and moves in the direction A, as shown in FIG. 4. The fuel gas is then introduced into the fuel gas passage 82 in the third separator 42 through the first and second intermediate fuel gas inlets 60a, 60b.

Since the fuel gas moves along the anode 36b of the second membrane electrode assembly 30, the oxygen-containing gas and the fuel gas are consumed by an electrochemical reaction in the electrode catalyst of the second membrane electrode assembly 30, generating electric energy. The oxygen-containing gas, whose oxygen has been consumed, is discharged to the oxygen-containing gas outlet 64, and the fuel gas, whose hydrogen has been consumed, is discharged to the fuel gas outlet 68.

The cooling medium is supplied to the cooling medium inlet 66 and moves along the cooling medium passage 84 in the third separator 42. Then, the cooling medium flows back around the wall panel 44, moves along the cooling medium passage 76 in the first separator 38, and is discharged to the cooling medium outlet 48.

In the first embodiment, when the oxygen-containing gas inlets 56 of the first sub-stack 12 are supplied with the oxygen-containing gas and the fuel gas inlets 46 thereof are supplied with the fuel gas, the oxygen-containing gas and the fuel gas are partly consumed in the first sub-stack 12, and then discharged to the oxygen-containing gas outlets 64 and the fuel gas outlets 68, from which the oxygen-containing gas and the fuel gas are delivered to the intermediate plate 18a.

Then, the oxygen-containing gas and the fuel gas pass respectively through the oxygen-containing gas mixing passage 92 and the fuel gas mixing passage 94 and are supplied respectively to the oxygen-containing gas inlets 56 and the fuel gas inlets 46 of the second sub-stack 14. The oxygen-containing gas and the fuel gas are then discharged respectively to the oxygen-containing gas outlets 64 and the fuel gas outlets 68 of the second sub-stack 14, from which the oxygen-containing gas and the fuel gas are delivered to the intermediate plate 18b. The oxygen-containing gas and the fuel gas then flow respectively through the oxygen-containing gas mixing passage 92 and the fuel gas mixing passage 94 of the intermediate plate 18b and are supplied respectively to the oxygen-containing gas inlets 56 and the fuel gas inlets 46 of the third sub-stack 16.

In the first through third sub-stacks 12, 14, 16, the oxygen-containing gas and the fuel gas are supplied to the oxygen-containing gas inlets 56 and the fuel gas inlets 46 and thereafter discharged to the oxygen-containing gas outlets 64 and the fuel gas outlets 68 at all times. Consequently, the first through third sub-stacks 12, 14, 16 may be constructed of the same set of parts. Because the first through third sub-stacks 12, 14, 16 may employ the first through third separators 38, 40, 42 of the same type, the fuel cell stack 10 is constructed of a reduced number of types of parts and is economical as its cost is relatively low.

In the first embodiment, the first sub-stack 12 is supplied with an oxygen-containing gas and moisture (actually a humidified oxygen-containing gas) in an amount required to operate the first sub-stack 12. Since the cell assemblies 20 of the first sub-stack 12 are supplied with a humidified oxygen-containing gas in an amount required for a desired reaction, the desired reaction takes place in the cell assemblies 20.

Water is generated in each of the cell assemblies 20 by the reaction. The generated water moves with the used oxygen-containing gas in the direction X along the oxygen-containing gas outlet 64, and is introduced into the oxygen-containing gas mixing passage 92 of the intermediate plate 18a which is interposed between the first and second sub-stacks 12, 14. The oxygen-containing gas mixing passage 92 is supplied with a low-humidity oxygen-containing gas from the low-humidity oxygen-containing gas supply ports 65.

The oxygen-containing gas mixing passage 92 is relatively long, extending within the surface 90 of the intermediate plate 18a toward the oxygen-containing gas inlets 56. The ribs of the guide 96 in the oxygen-containing gas mixing passage 92 have their positions, lengths, directions, and intervals preselected. When the used oxygen-containing gas introduced from the oxygen-containing gas outlets 64 into the oxygen-containing gas mixing passage 92 and the unused oxygen-containing gas introduced from the low-humidity oxygen-containing gas supply ports 65 into the oxygen-containing gas mixing passage 92 flow through the oxygen-containing gas mixing passage 92, these oxygen-containing gases are uniformly mixed with each other over a sufficient mixing distance provided by the guide 96 and due to a disturbing action of the guide 96, and thereafter delivered from the oxygen-containing gas inlets 56 to the second sub-stack 14.

The second sub-stack 14 is supplied with an amount of sufficiently humidified oxygen-containing gas which is required to operate the second sub-stack 14. Therefore, the humidity and oxygen concentration of the oxygen-containing gas supplied to the second sub-stack 14 are prevented from varying, allowing the desired reaction to take place reliably in the second sub-stack 14. Water generated in the second sub-stack 14 can be used as water for humidifying the oxygen-containing gas supplied to the second sub-stack 14. Therefore, the amount of water needed to humidify the oxygen-containing gas can greatly be reduced.

The low-humidity oxygen-containing gas supply ports 65 make up communication holes defined in the first sub-stack 12 and extending in the direction in which the cell assemblies 20 are stacked. Thus, the unused oxygen-containing gas is adjusted to a temperature which is substantially the same as the temperature of the second sub-stack 12, and thereafter is supplied to the intermediate plate 18a. Therefore, the temperature of the mixed oxygen-containing gases is prevented from varying, making it possible to effectively increase the electric energy generating capability of the fuel cell stack 10.

The fuel gas outlets 68 supply a low-concentration fuel gas, i.e., a fuel gas whose concentration has been lowered by its consumption in a reaction while the amount of humidifying water is kept at a constant level, to the fuel gas mixing passage 94, and the low-humidity fuel gas supply ports 69 supply an unused low-humidity fuel gas to the fuel gas mixing passage 94. In the fuel gas mixing passage 94, as with the oxygen-containing gas mixing passage 92, the humidified fuel gas and the unused low-humidity fuel gas are uniformly mixed by a disturbing and mixing action of the guide 98, and thereafter supplied from the fuel gas inlets 46 to the second sub-stack 14. Inasmuch as the oxygen-containing gas mixing passage 92 and the fuel gas mixing passage 94 are defined in the same surface 90 of the intermediate plate 18a. Therefore, the thickness of the intermediate plate 18a can easily be reduced.

In the first embodiment, the amount of humidifying water used in the fuel cell stack 10 is reduced, and the downstream second sub-stack 14 and the further downstream third sub-stack 16 can reliably be supplied with an oxygen-containing gas and a fuel gas whose humidity and concentration are not varied. Therefore, the humidifying structure is greatly reduced in size, and the overall fuel cell stack 10 is simplified in structure and reduced in size, and maintains an effective electric energy generating capability.

Figure 6:
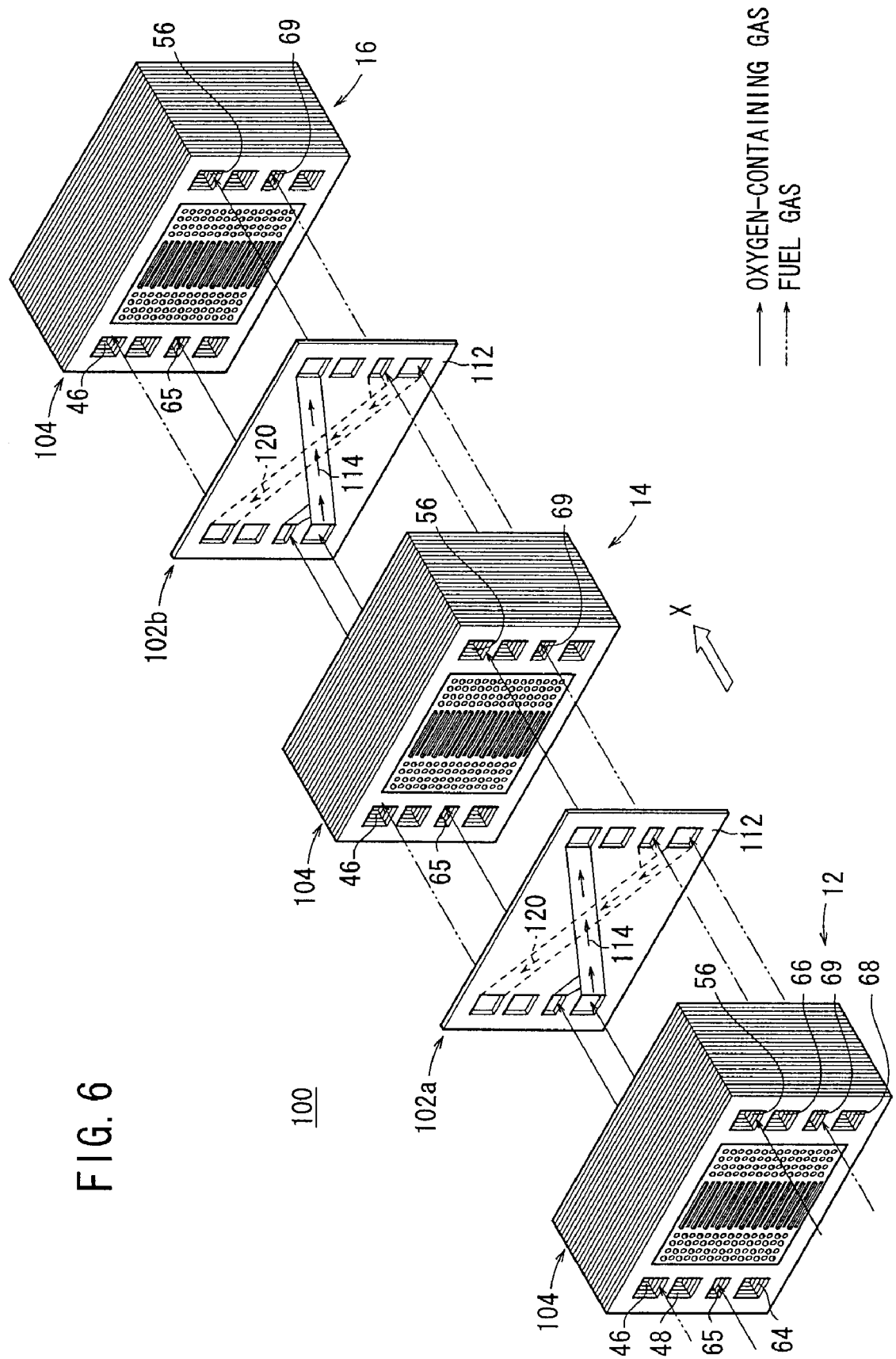
FIG. 6 is an exploded perspective view of a portion of a fuel cell stack according to a second embodiment of the present invention.

FIG. 6 shows in exploded perspective a portion of a fuel cell stack 100 according to a second embodiment of the present invention. Those parts of the fuel cell stack 100 which are identical to those of the fuel cell stack 10 according to the first embodiment are denoted by identical reference characters, and will not be described in detail below.

Figure 7:
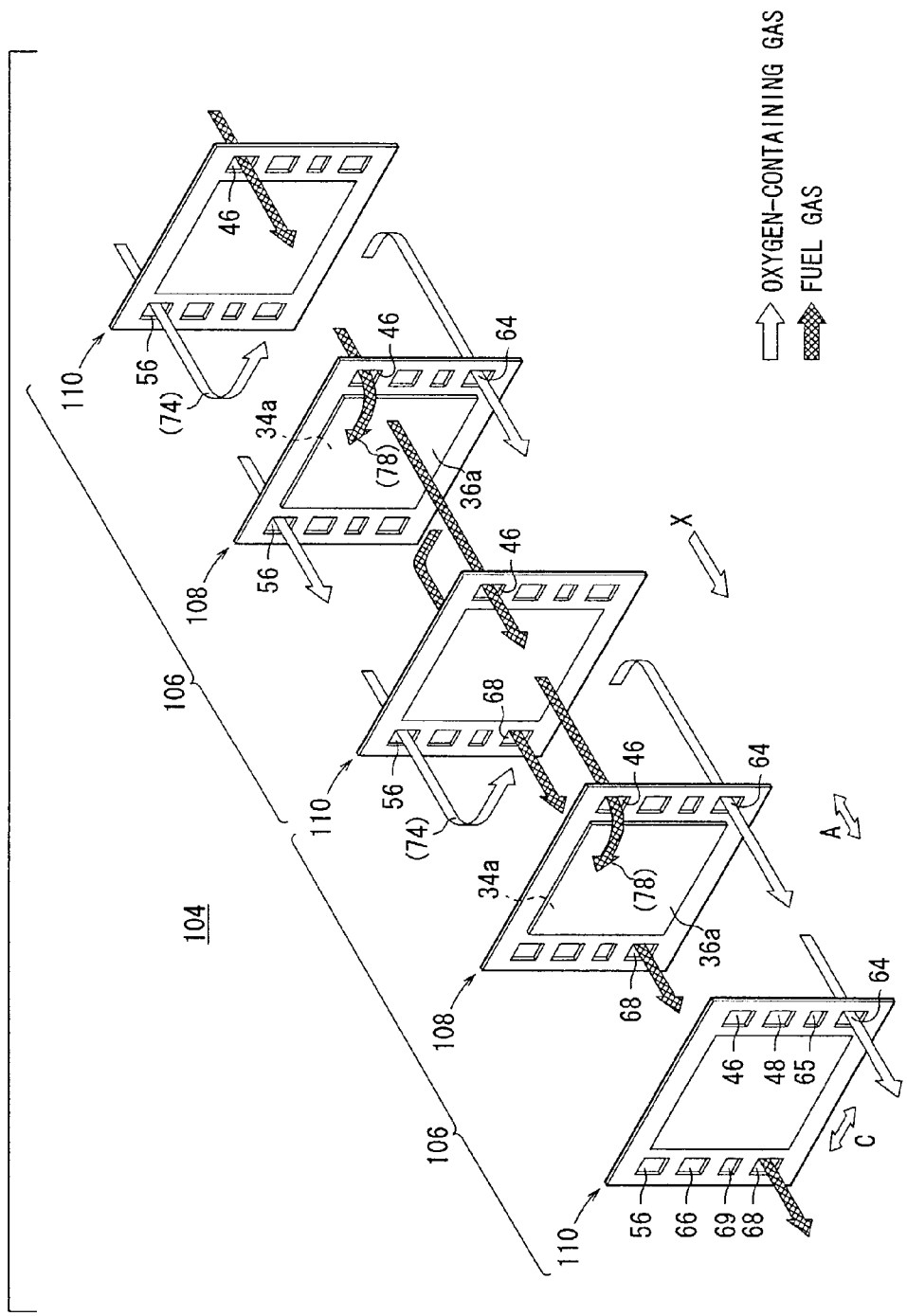
FIG. 7 is an exploded perspective view showing flows of an oxygen-containing gas and a fuel gas in the fuel cell stack shown in FIG. 6.

The fuel cell stack 100 comprises first, second, and third sub-stacks 12, 14, 16 with intermediate plates 102a, 102b interposed therebetween. As shown in FIG. 7, each of the first through third sub-stacks 12, 14, 16 comprises a stack of cell assemblies 104 each having a plurality of unit cells 106 stacked in the direction A. Each of the unit cells 106 comprises a membrane electrode assembly 108 and separators 110 sandwiching the membrane electrode assembly 108 therebetween.

The unit cells 106 have, defined in one longitudinal end thereof in the direction indicated by the arrow C, respective fuel gas inlets 46 communicating with each other in the direction A, respective cooling medium outlets 48 communicating with each other in the direction A, low-humidify oxygen-containing gas supply ports 65 communicating with each other in the direction A, and respective oxygen-containing gas outlets 64 communicating with each other in the direction A. The unit cells 106 also have, defined in the other longitudinal end thereof, respective oxygen-containing gas inlets 56 communicating with each other in the direction A, respective cooling medium inlets 66 communicating with each other in the direction A, low-humidity fuel gas supply ports 69 communicating with each other in the direction A, and respective fuel gas outlets 68 communicating with each other in the direction A.

Figure 8:
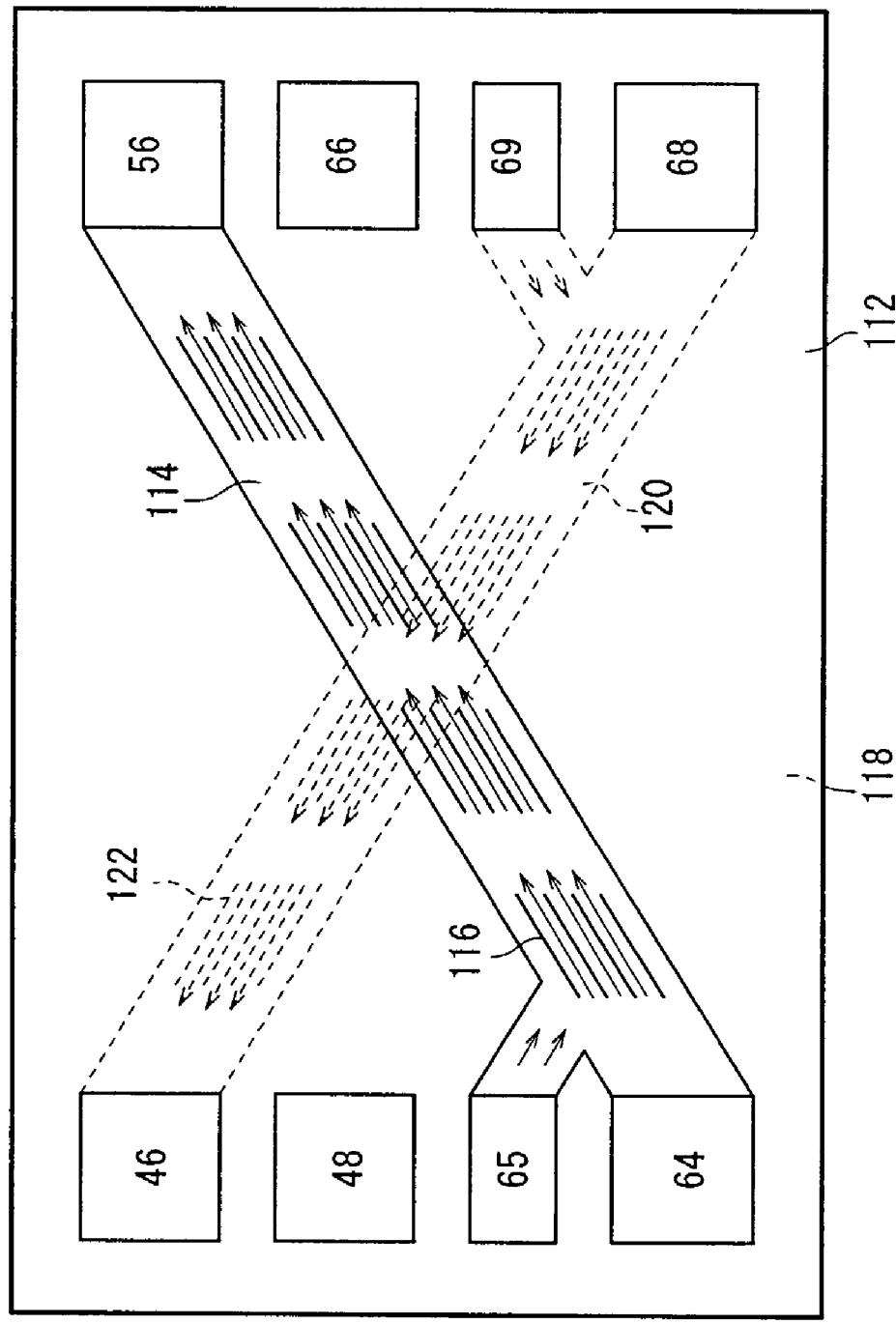
FIG. 8 is a front elevational view of an intermediate plate of the fuel cell stack shown in FIG. 6.

As shown in FIG. 8, each of the intermediate plates 102a, 102b has, defined in one surface 112 thereof, an oxygen-containing gas mixing passage (oxygen-containing gas flow changing passage) 114 interconnecting the oxygen-containing gas outlets 64, the low-humidify oxygen-containing gas supply ports 65, and the oxygen-containing gas inlets 56. The oxygen-containing gas mixing passage 114 comprises an elongate passage extending diagonally along the surface 112, and has a guide 116 disposed therein.

The guide 116 comprises a plurality of ribs disposed in the oxygen-containing gas mixing passage 114. The positions, lengths, directions, and intervals of these ribs are selected to uniformly mixing with each other an unused oxygen-containing gas supplied from the low-humidify oxygen-containing gas supply ports 65 to the oxygen-containing gas mixing passage 114 and a used oxygen-containing gas supplied from the oxygen-containing gas outlets 64 to the oxygen-containing gas mixing passage 114.

Each of the intermediate plates 102a, 102b has, defined in the other surface 118 thereof, a fuel gas mixing passage (fuel gas flow changing passage) 120 interconnecting the fuel gas outlets 68, the low-humidify fuel gas supply ports 69, and the fuel gas inlets 46. The fuel gas mixing passage 120 comprises an elongate passage extending diagonally along the surface 118 across the oxygen-containing gas mixing passage 114, and has a guide 122 disposed therein which comprises a plurality of ribs disposed in the fuel gas mixing passage 120. The positions, lengths, directions, and intervals of these ribs are selected to uniformly mixing with each other an unused fuel gas supplied from the low-humidity fuel gas supply ports 69 to the fuel gas mixing passage 120 and a used fuel gas supplied from the fuel gas outlets 68 to the fuel gas mixing passage 120.

The fuel cell stack 100 according to the second embodiment thus constructed operates as follows: When an oxygen-containing gas, a fuel gas, and a cooling medium are supplied to the first sub-stack 12, as shown in FIG. 7, the oxygen-containing gas is introduced into the oxygen-containing gas passage 74 of the separator 110, and moves along the cathode 34a of the first membrane electrode assembly 108. The fuel gas is introduced into the fuel gas passage 78 of the separator 10, and moves along the anode 36a of the first membrane electrode assembly 108. In the first membrane electrode assembly 108, therefore, the oxygen-containing gas supplied to the cathode 34a and the fuel gas supplied to the anode 36a are consumed by an electrochemical reaction in the electrode catalyst, generating electric energy.

The oxygen-containing gas and the fuel gas which have been consumed in the unit cells 106 are discharged to the oxygen-containing gas outlets 64 and the fuel gas outlets 68, and delivered to the intermediate plate 102a positioned downstream of the first sub-stack 12. On the surface 112 of the intermediate plate 102a, the humidified oxygen-containing gas is supplied from the oxygen-containing gas outlets 64 to the oxygen-containing gas mixing passage 114, and the unused low-humidity oxygen-containing gas is supplied from the low-humidity oxygen-containing gas supply ports 65 to the oxygen-containing gas mixing passage 114.

The oxygen-containing gas mixing passage 114 is elongate diagonally along the surface 112 of the intermediate plate 102a, and the ribs of the guide 116 have their positions, lengths, directions, and intervals preselected. Thus, the humidified oxygen-containing gas and the unused low-humidity oxygen-containing gas which are supplied to the oxygen-containing gas mixing passage 114 are sufficiently and uniformly mixed with each other, and then supplied to the oxygen-containing gas inlets 56 of the second sub-stack 14.

On the other surface 118 of the intermediate plate 102a, the low-concentration fuel gas is supplied from the fuel gas outlets 68 to the fuel gas mixing passage 120, and the unused low-humidity fuel gas is supplied from the low-humidity fuel gas supply ports 69 to the fuel gas mixing passage 120. In the fuel gas mixing passage 120, therefore, as with the oxygen-containing gas mixing passage 114, the humidified fuel gas and the unused low-humidity fuel gas are uniformly mixed by a disturbing and mixing action of the guide 122, and thereafter supplied to the fuel gas inlets 46 of the second sub-stack 14.

In the second embodiment, since the oxygen-containing gas and the fuel gas are supplied via the intermediate plates 102a, 102b to the oxygen-containing gas inlets 56 and the fuel gas inlets 46 of the second and third sub-stacks 14, 16. Therefore, the first through third sub-stacks 12, 14, 16 may employ the separators 110 of the same type. The fuel cell stack 100 according to the second embodiment is constructed of a reduced number of types of parts and is economical as its cost is relatively low.

In the second embodiment, the amount of humidifying water is reduced, and the downstream second sub-stack 14 and the further downstream third sub-stack 16 can reliably be supplied with an oxygen-containing gas and a fuel gas whose humidity and concentration are not varied. Therefore, the fuel cell stack 100 is simplified in structure and reduced in size, and maintains an effective electric energy generating capability.

On the intermediate plate 102a, the oxygen-containing gas mixing passage 114 is defined in the surface 112, and the fuel gas mixing passage 120 is defined in the other surface 118. The combined length of the oxygen-containing gas mixing passage 114 and the fuel gas mixing passage 120 is large enough to mix the oxygen-containing gas and the fuel gas reliably and uniformly with each other.

Figure 9:
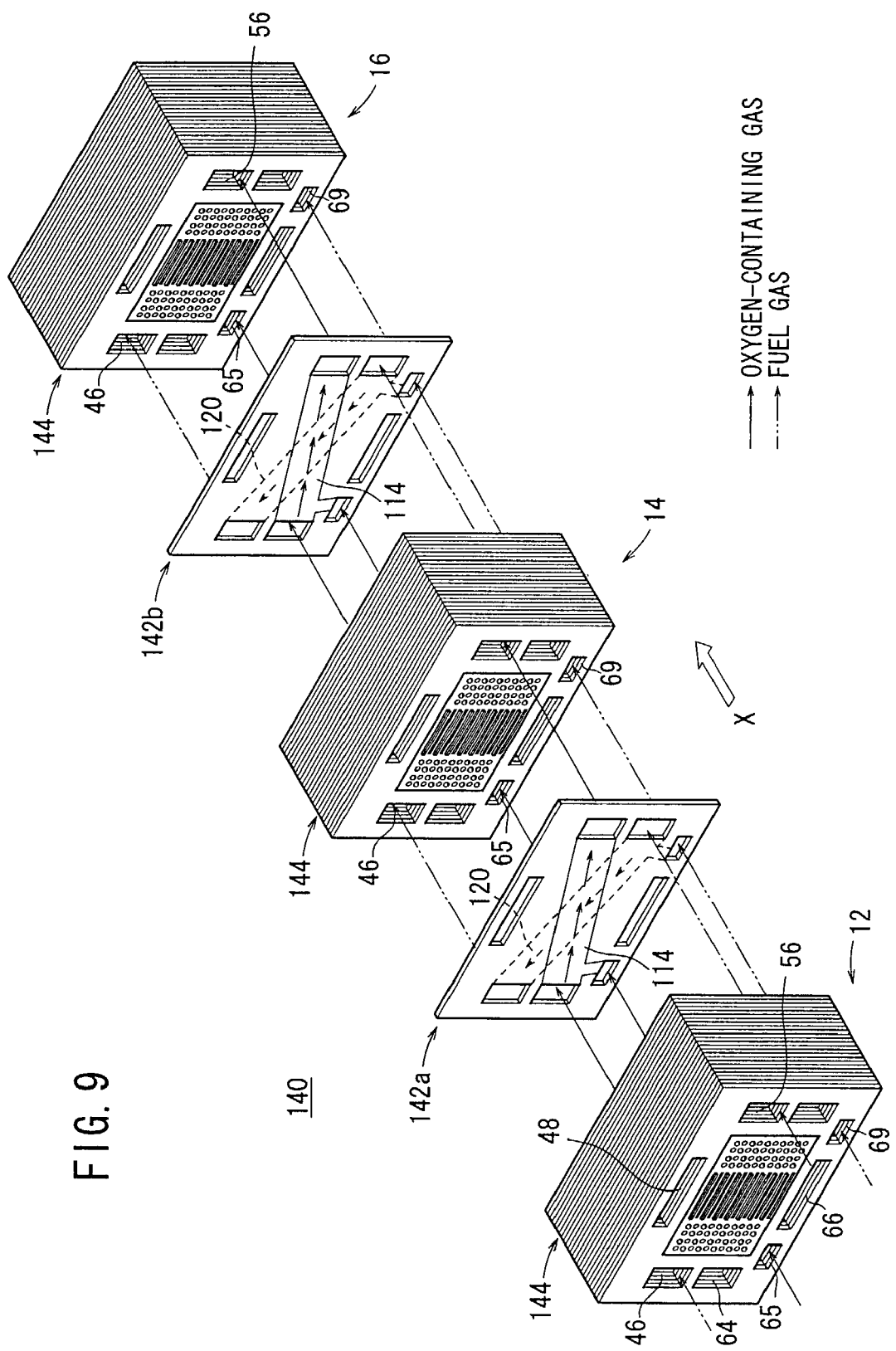
FIG. 9 is an exploded perspective view of a portion of a fuel cell stack according to a third embodiment of the present invention.

FIG. 9 shows in exploded perspective a portion of a fuel cell stack 140 according to a third embodiment of the present invention. Those parts of the fuel cell stack 140 which are identical to those of the fuel cell stacks 10, 100 according to the first and second embodiments are denoted by identical reference characters, and will not be described in detail below.

Figure 10:
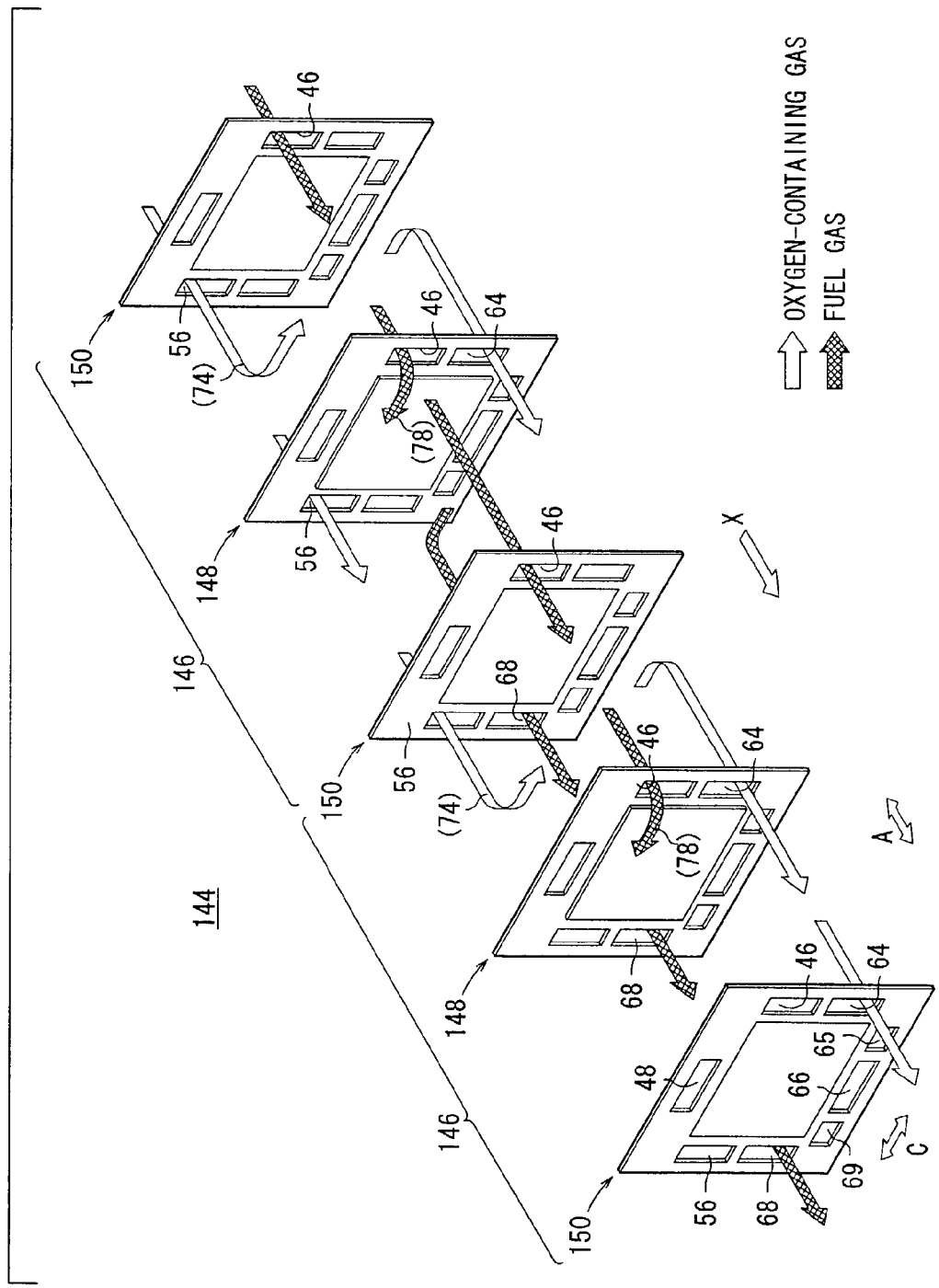
FIG. 10 is an exploded perspective view showing flows of an oxygen-containing gas and a fuel gas in the fuel cell stack shown in FIG. 9.
Figure 11:
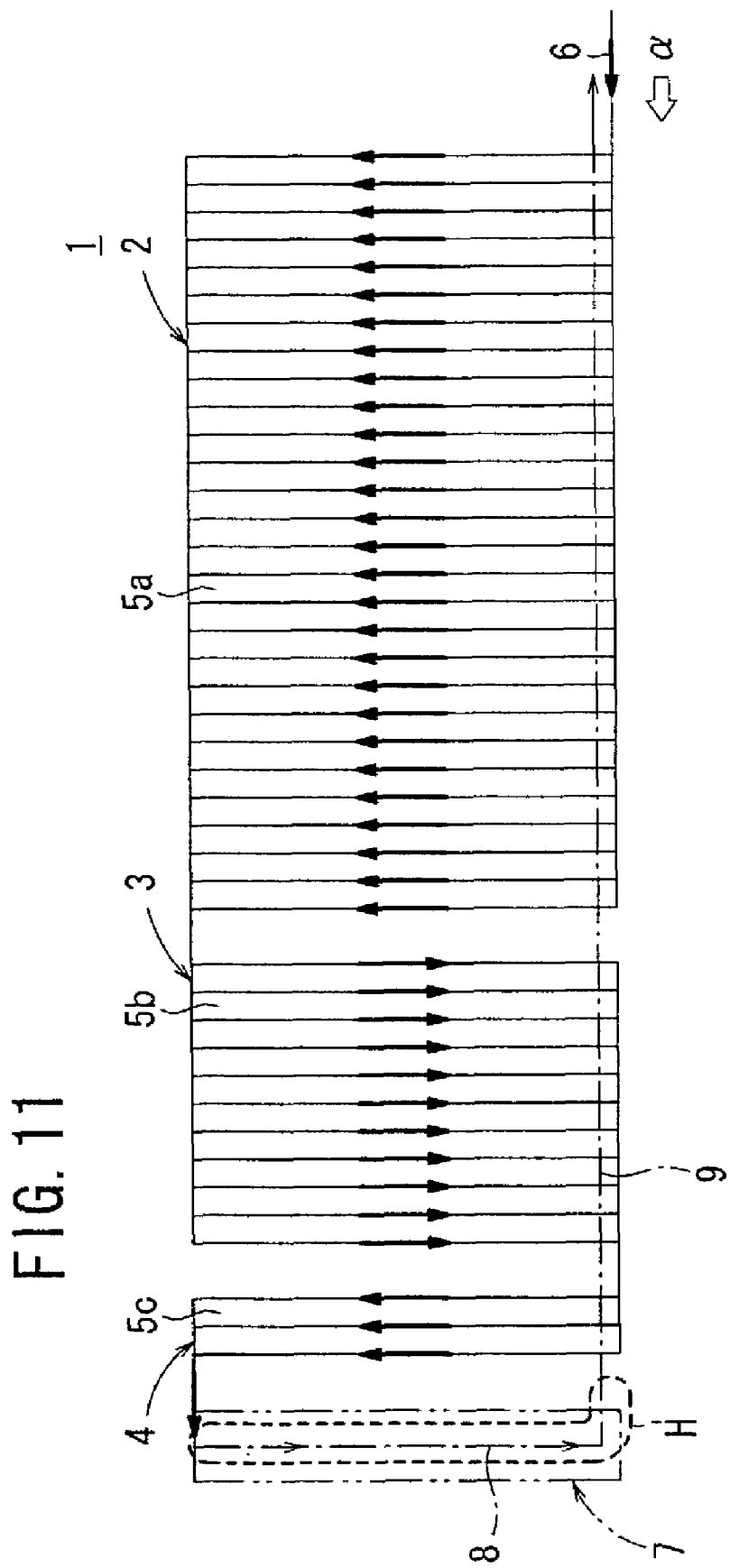
FIG. 11 is a schematic view of a conventional fuel cell block.
Figure 12:
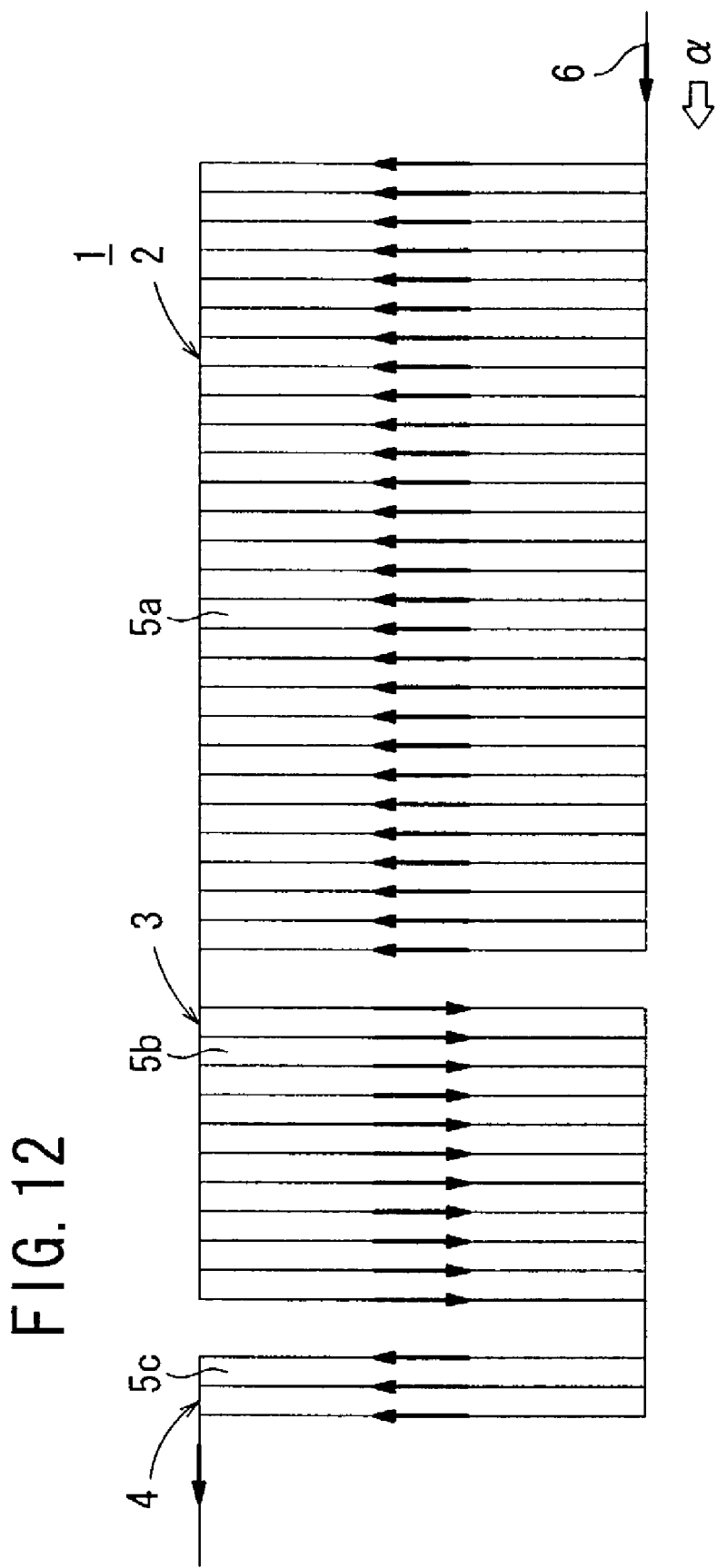
FIG. 12 is a schematic view of a conventional fuel cell block.
Figure 13:
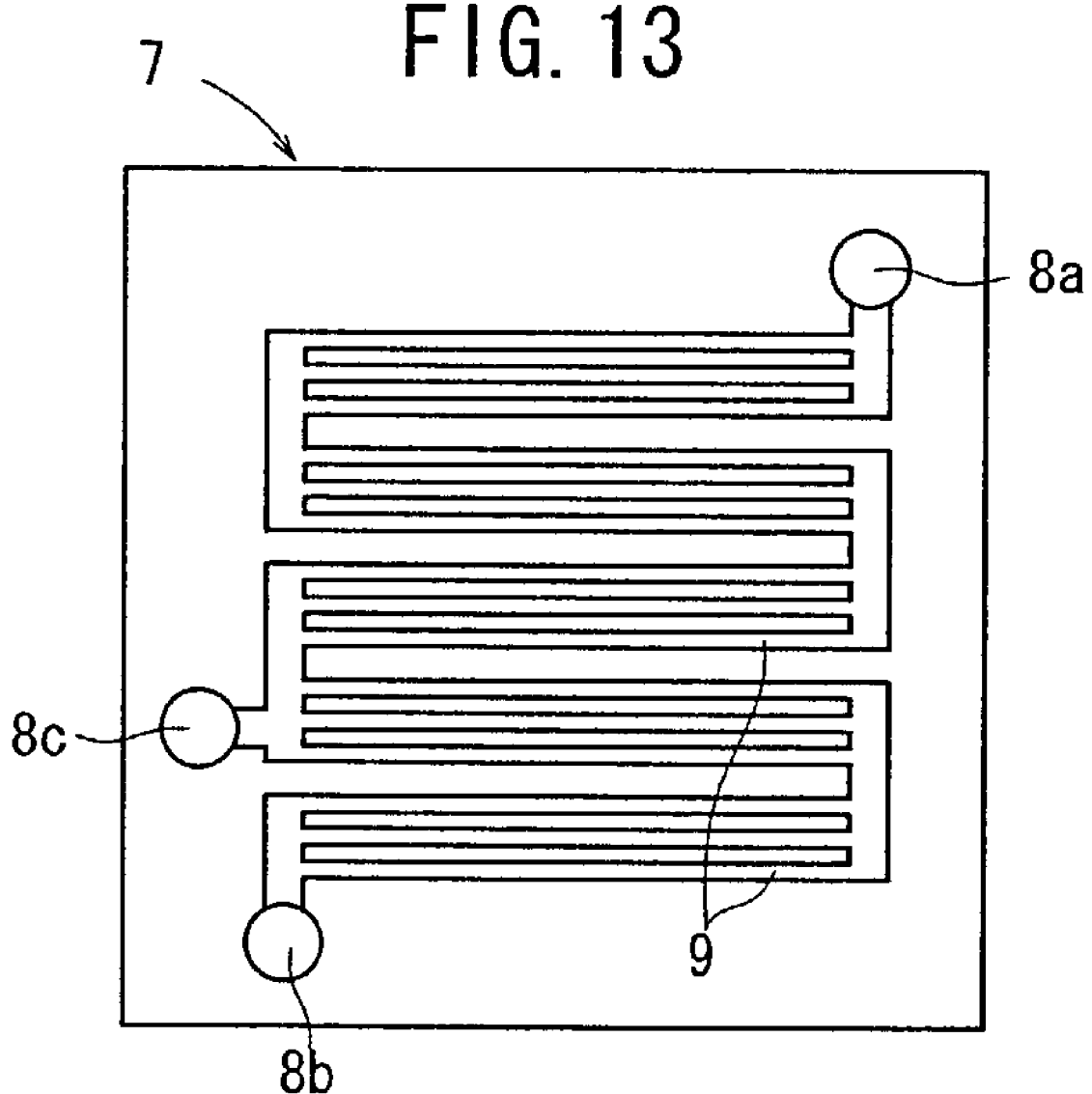
FIG. 13 is a front elevational view of a separator of a conventional solid polymer electrolyte fuel cell.

The fuel cell stack 140 comprises first, second, and third sub-stacks 12, 14, 16 with intermediate plates 142a, 142b interposed therebetween. As shown in FIG. 10, each of the first through third sub-stacks 12, 14, 16 comprises a stack of cell assemblies 144 each having a plurality of unit cells 146 stacked in the direction A. Each of the unit cells 146 comprises a membrane electrode assembly 148 and separators 150 sandwiching the membrane electrode assembly 148 therebetween.

The unit cells 146 have, defined in one longitudinal end thereof in the direction C, respective fuel gas inlets 46 communicating with each other in the direction A, and respective oxygen-containing gas outlets 64 communicating with each other in the direction A. The unit cells 146 also have, defined in the other longitudinal end thereof, respective oxygen-containing gas inlets 56 communicating with each other in the direction A, and fuel gas outlets 68 communicating with each other in the direction A.

The unit cells 146 also have, defined in a lower edge thereof, respective cooling medium inlets 66 defined centrally therein communicating with each other in the direction A, respective low-humidify oxygen-containing gas supply ports 65 near the oxygen-containing gas outlets 64, and respective low-humidify fuel gas supply ports 69 near the fuel gas outlets 68. The unit cells 146 further have respective cooling medium outlets 48 defined centrally in an upper edge thereof.

As shown in FIG. 9, each of the intermediate plates 142a, 142b has an oxygen-containing gas mixing passage 114 defined in one surface 112 thereof and a fuel gas mixing passage 120 defined in the other surface 112 which extends diagonally across the oxygen-containing gas mixing passage 114.

In the fuel cell stack 140 according to the third embodiment, an oxygen-containing gas discharged from the first sub-stack 12 is supplied to the oxygen-containing gas mixing passage 114 in the surface 112 of the intermediate plate 102a, and an unused low-humidity oxygen-containing gas is supplied from the low-humidity oxygen-containing gas supply ports 65 to the oxygen-containing gas mixing passage 114. The humidified oxygen-containing gas and the unused low-humidity oxygen-containing gas are uniformly mixed in the oxygen-containing gas mixing passage 114, and then supplied to the fuel gas inlets 56 of the second sub-stack 14.

On the other surface 118 of the intermediate plate 142a, the low-concentration fuel gas is supplied from the fuel gas outlets 68 to the fuel gas mixing passage 120, and the unused low-humidity fuel gas is supplied from the low-humidity fuel gas supply ports 69 to the fuel gas mixing passage 120. Therefore, the low-concentration fuel gas and the unused low-humidity fuel gas are uniformly mixed in the fuel gas mixing passage 120, and then supplied to the fuel gas inlets 46 of the second sub-stack 14.

According to the third embodiment, therefore, the first through third sub-stacks 12, 14, 16 can be made up of the same set of parts, and the fuel cell stack 140 is economical as its cost is relatively low.

In the third embodiment, furthermore, the amount of humidifying water used in the entire fuel cell stack 140 is greatly reduced, and the downstream second sub-stack 14 and the further downstream third sub-stack 16 maintain an effective electric energy generating capability.

In the first through third embodiments, the cell assemblies 20, 104, 144 are of a horizontal type with their longer sides lying horizontally. However, the cell assemblies may be vertically oriented such that their longer sides extend vertically.

In the fuel cell stack according to the present invention, since the reactant gas discharged to the reactant gas outlet communication passages of an upstream sub-stack is supplied through the passages of the intermediate plate to the reactant gas inlet communication passages of a downstream sub-stack, the reactant gas is supplied from the reactant gas inlet communication passage in each sub-stack and thereafter discharged from the reactant gas outlet communication passage in each sub-stack. Since all the sub-stacks can use the same type of separators, the fuel cell stack is highly economical as it is not necessary to prepare different types of separators for use in the sub-stacks.

In the fuel cell stack according to the present invention, the passage is defined in the surface of the intermediate plate interposed between adjacent sub-stacks. After the unused additional reactant gas supplied from the additional reactant gas supply ports along the guide in the passage is uniformly mixed with the used reactant gas supplied from the upstream reactant gas outlet communication passages, the mixture is delivered to the downstream reactant gas outlet communication passages.

Consequently, the reactant gas supplied to each of the sub-stacks has its humidity and concentration prevented from varying, allowing the sub-stacks to maintain an effective electric energy generating capability. The amount of humidifying water used in the entire fuel cell stack can greatly be reduced with a simple arrangement.

Although certain preferred embodiments of the present invention have been shown and described in detail, it should be understood that various changes and modifications may be made therein without departing from the scope of the appended claims.

What is claimed is:

1. A fuel cell stack comprising a stack of sub-stacks with intermediate plates interposed therebetween, each of the sub-stacks comprising a stack of membrane electrode assemblies with separators interposed therebetween, each comprising an anode, a cathode, and an ion exchange membrane sandwiched between the anode and the cathode, wherein said sub-stacks constitute an inner manifold in which a reactant gas inlet communication passage and a reactant gas outlet communication passage respectively penetrate straight through said stack of sub-stacks in the stacking direction, said inner manifold allowing the reactant gas to flow in straight paths through said reactant gas inlet communication passage and said reactant gas outlet communication passage, as well as in paths branching from said reactant gas inlet communication passage and said reactant gas outlet communication passage and extending between said separators and said membrane electrode assemblies, wherein said reactant gas inlet communication passage of an upstream sub-stack is in alignment with said reactant gas inlet communication passage of a downstream sub-stack in the stacking direction, and said reactant gas outlet communication passage of said upstream sub-stack is in alignment with said reactant gas outlet communication passage of said downstream sub-stack in the stacking direction, and wherein each of said intermediate plates has an interconnecting passage for interconnecting said reactant gas outlet communication passage of said upstream sub-stack and said reactant gas inlet communication passage of said downstream sub-stack, with respect to a direction in which said reactant gas is supplied.

2. A fuel cell stack according to claim 1, wherein said interconnecting passage includes;

an oxygen-containing gas flow changing passage for passing an oxygen-containing gas as said reactant gas therethrough; and a fuel gas flow changing passage for passing a fuel gas as said reactant gas therethrough, said oxygen-containing gas flow changing passage and said fuel gas flow changing passage being defined in the same surface of said intermediate plate.

3. A fuel cell stack according to claim 1, wherein said interconnecting passage includes:

an oxygen-containing gas flow changing passage for passing an oxygen-containing gas as said reactant gas therethrough; and a fuel gas flow changing passage for passing a fuel gas as said reactant gas therethrough, said oxygen-containing gas flow changing passage being defined in one surface of said intermediate plate and said fuel gas flow changing passage being defined in the other surface of said intermediate plate.

4. A fuel cell stack comprising a stack of sub-stacks with intermediate plates interposed therebetween, each of the sub-stacks comprising a stack of membrane electrode assemblies with separators interposed therebetween, each comprising an anode, a cathode, and an ion exchange membrane sandwiched between the anode and the cathode, wherein said sub-stacks constitute an inner manifold in which a reactant gas inlet communication passage and a reactant gas outlet communication passage respectively penetrate straight through said stack of sub-stacks in the stacking direction, said inner manifold allowing the reactant gas to flow in straight paths through said reactant gas inlet communication passage and said reactant gas outlet communication passage, as well as in paths branching from said reactant gas inlet communication passage and said reactant gas outlet communication passage and extending between said separators and said membrane electrode assemblies, wherein said reactant gas inlet communication passage of an upstream first sub-stack is in alignment with said reactant gas inlet communication passage of a downstream second sub-stack in the stacking direction, and said reactant gas outlet communication passage of said first sub-stack is in alignment with said reactant gas outlet communication passage of said second sub-stack in the stacking direction, and wherein each of said intermediate plates has an interconnecting passage for interconnecting said reactant gas outlet communication passage of said first sub-stack, an additional reactant gas supply port disposed near said reactant gas outlet communication passage, and said reactant gas inlet communication passage of said second sub-stack, with respect to a direction in which said reactant gas is supplied, said interconnecting passage having a guide for mixing an unused additional reactant gas supplied from said additional reactant gas supply port with a used reactant gas supplied from said reactant gas outlet communication passage, and delivering the mixed reactant gases to said reactant gas inlet communication passage.

5. A fuel cell stack according to claim 4, wherein said additional reactant gas supply port comprises a communication hole extending in said sub-stacks along said stack of membrane electrode assemblies, for supplying said unused additional reactant gas through said communication hole in the sub-stacks to said intermediate plates.

6. A fuel cell stack according to claim 4, wherein said interconnecting passage includes:

an oxygen-containing gas mixing passage for mixing an unused additional oxygen-containing gas with a used oxygen-containing gas as said reactant gas therein; and a fuel gas mixing passage for mixing an unused additional fuel gas with a used fuel gas as said reactant gas therein, said oxygen-containing gas mixing passage and said fuel gas mixing passage being defined in the same surface of said intermediate plate.

7. A fuel cell stack according to claim 4, wherein said interconnecting passage includes:

an oxygen-containing gas mixing passage for mixing an unused additional oxygen-containing gas with a used oxygen-containing gas as said reactant gas therein; and a fuel gas mixing passage for mixing an unused additional fuel gas with a used fuel gas as said reactant gas therein, said oxygen-containing gas mixing passage being defined in one surface of said intermediate plate and said fuel gas mixing passage being defined in the other surface of said intermediate plate.

8. A fuel cell stack according to claim 1, wherein the intermediate plates are separate and distinct from the separators.

9. A fuel cell stack according to claim 1, wherein each of the intermediate plates further includes a cooling medium inlet and a cooling medium outlet.

* * * * *